(12) United States Patent
Gorski et al.

(10) Patent No.: US 10,848,954 B1
(45) Date of Patent: Nov. 24, 2020

(54) CONDITIONAL REPETITIVE WIRELESS DEVICE SEARCHING

(71) Applicant: FORD GLOBAL TECHNOLOGIES, LLC, Dearborn, MI (US)

(72) Inventors: Ryan Joseph Gorski, Grosse Pointe Farms, MI (US); William Ko, Troy, MI (US); Ahmet Cinar, Cologne NRW (DE); Fouad Bounefissa, Oakville (CA); Howard Paul Tsvi Linden, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/563,253

(22) Filed: Sep. 6, 2019

(51) Int. Cl.
| | |
|---|---|
| *H04W 8/00* | (2009.01) |
| *H04W 4/40* | (2018.01) |
| *H04W 4/80* | (2018.01) |
| *H01Q 21/00* | (2006.01) |
| *B60R 25/24* | (2013.01) |
| *B60R 25/20* | (2013.01) |
| *H01Q 1/32* | (2006.01) |
| *G07C 9/29* | (2020.01) |

(52) U.S. Cl.
CPC .......... *H04W 8/005* (2013.01); *B60R 25/209* (2013.01); *B60R 25/24* (2013.01); *G07C 9/29* (2020.01); *H01Q 1/3241* (2013.01); *H01Q 21/00* (2013.01); *H04W 4/40* (2018.02); *H04W 4/80* (2018.02); *B60R 2325/101* (2013.01); *B60R 2325/205* (2013.01)

(58) Field of Classification Search
CPC ......... H04W 8/005; H04W 4/80; H04W 4/40; G07C 9/29; B60R 25/209; B60R 25/24
See application file for complete search history.

(56) References Cited

U.S. PATENT DOCUMENTS

| 9,865,112 | B2 | 1/2018 | Maiwand et al. | |
|---|---|---|---|---|
| 10,128,902 | B1* | 11/2018 | Cheung | H04B 7/0805 |
| 10,202,102 | B2 | 2/2019 | Hiramine | |
| 2014/0188348 | A1* | 7/2014 | Gautama | B60W 10/30 701/48 |
| 2016/0221536 | A1* | 8/2016 | Petel | B60R 25/24 |
| 2017/0282858 | A1* | 10/2017 | Sass | B60R 25/24 |

(Continued)

*Primary Examiner* — Nabil H Syed
(74) *Attorney, Agent, or Firm* — Frank Lollo; Brooks Kushman P.C.

(57) ABSTRACT

A vehicle includes a search system including at least one antenna, a wireless transceiver control module, and a processor. The processor receives a vehicle access request. The processor then sends a search instruction to the wireless transceiver control module to search for an authorized wireless device within a predefined distance of the vehicle. The processor receives a response, to the request, from the wireless transceiver control module indicating search results and a state indicator indicating a state of the search system. When the state indicator indicates a state predefined as corresponding to a final result state for fulfilling the request, the processor utilizes the search results to determine if the access request should be granted and when the state indicator indicates a state predefined as corresponding to an in-progress state, which will result in an improved response at a future time, the processor re-instructs the search and repeats response reception.

20 Claims, 3 Drawing Sheets

(56) References Cited

U.S. PATENT DOCUMENTS

2018/0072268 A1* 3/2018 Lee ................ B60R 25/241
2018/0103414 A1* 4/2018 Golsch ............ B60R 25/2018
2018/0248811 A1* 8/2018 Di Nallo .......... H04L 1/08

* cited by examiner

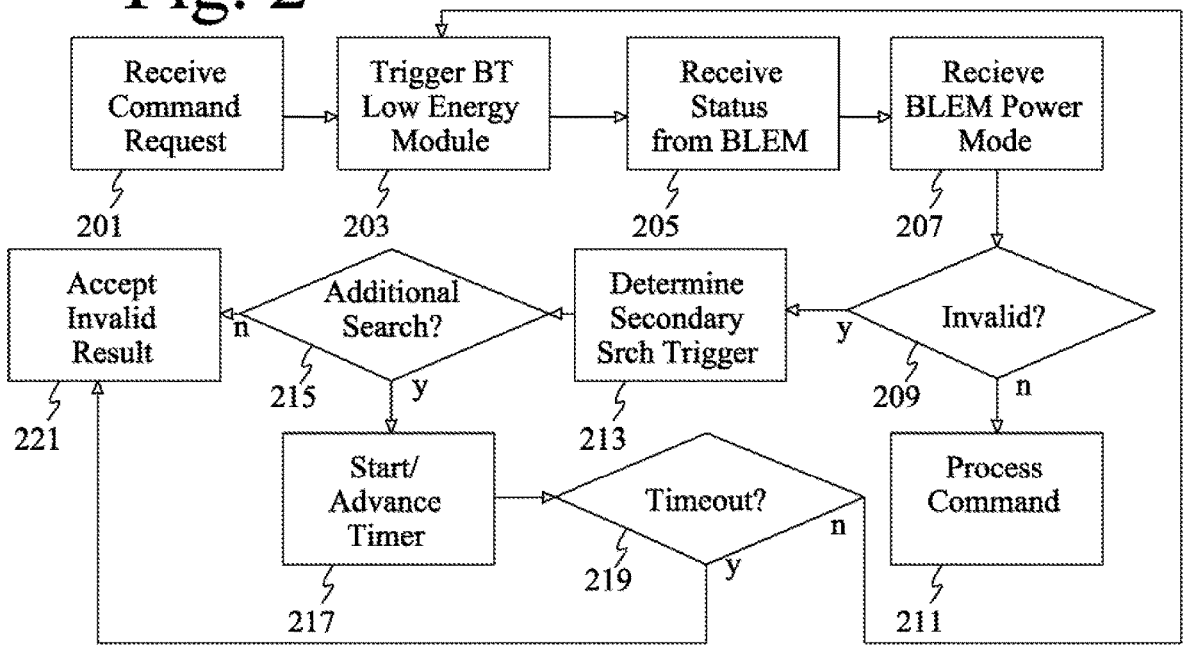
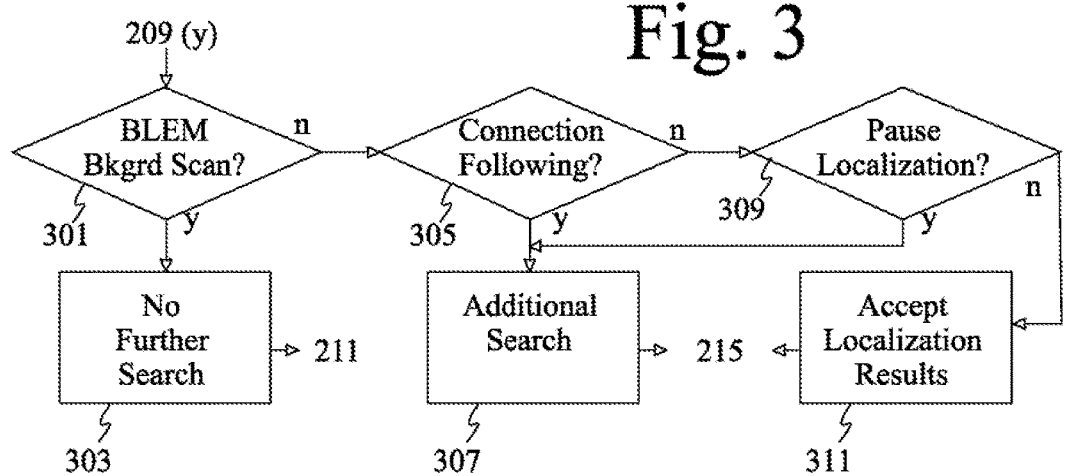

CONDITIONAL REPETITIVE WIRELESS DEVICE SEARCHING

The illustrative embodiments generally relate to methods and apparatuses for conditional repetitive wireless device searching.

BACKGROUND

Vehicles are increasingly moving towards more wireless and mobile-oriented functionality. This includes wireless entry via key fobs, wireless push-to-start, etc. The interaction between the vehicle and a wireless device is often facilitated or authenticated via BLUETOOTH or similar short-range wireless communication. In models where a user device is used to access the vehicle, BLUETOOTH is a communication medium that exists on most user devices and is usable by most vehicle computers. The communication can be used to send commands and/or authentication requests/responses.

Users have also come to expect near immediate responsiveness from their vehicles, so solutions must accommodate any limitations that can diminish the user experience. For users to be willing to substitute their own wireless devices (e.g. a phone) for those provided by an original equipment manufacturer (OEM), the user's may want as seamless a transition as possible. This encourages user participation and keeps the user experience at a high level.

SUMMARY

In a first illustrative example, a vehicle includes a search system including at least one antenna, a wireless transceiver control module, and a processor. The processor is configured to receive an access request for the vehicle, input via an input of the vehicle. The processor is further configured to, responsive to the access request, send a search instruction to the wireless transceiver control module to search for a wireless device, predefined as an authorized device, within a predefined distance of the vehicle using the search system. The processor is also configured to receive a response, to the request, from the wireless transceiver control module indicating search results and a state indicator indicating a state of the search system associated with the wireless transceiver control module. Additionally, when the state indicator indicates a state predefined as corresponding to a final result state for fulfilling the request, the processor is configured to utilize the search results to determine if the access request should be granted and when the state indicator indicates a state predefined as corresponding to an in-progress state, which will result in an improved response at a future time, the processor is configured to re-instruct the search and repeat the response reception.

In a second illustrative example, a vehicle includes an antenna array in communication with a BLUETOOTH low energy module (BLEM) and a processor. The processor is configured to receive an unlock request for the vehicle, input at the vehicle. The processor is also configured to, responsive to the unlock request, instruct the BLEM to confirm whether an authorized device is within a predefined distance of the vehicle, via a search using the antenna array. The processor is further configured to receive a response from the BLEM including a state indicator for the antenna array and, conditional on the state indicator, either utilize the response or repeat the instruction and reception of the response.

In a third illustrative example, a non-transitory computer-readable storage medium stores instructions that, when executed, cause a processor to perform the method including receiving a vehicle access request to access a vehicle. The method also includes, responsive to the request, instructing a wireless transceiver module to search for a wireless device within a predefined distance of the vehicle. Further, the method includes receiving a response from the wireless transceiver module, including a state of a search system used by the wireless transceiver module to complete the search for the wireless device and a result of the search for the wireless device. Also, the method includes either utilizing the result of the search or repeating the steps of instructing and receiving, contingent on the state of the search system.

BRIEF DESCRIPTION OF THE DRAWINGS

FIG. 2 shows an illustrative continual search process;

FIG. 3 shows an illustrative conditional evaluation for continual search; and

DETAILED DESCRIPTION

Figure 1:
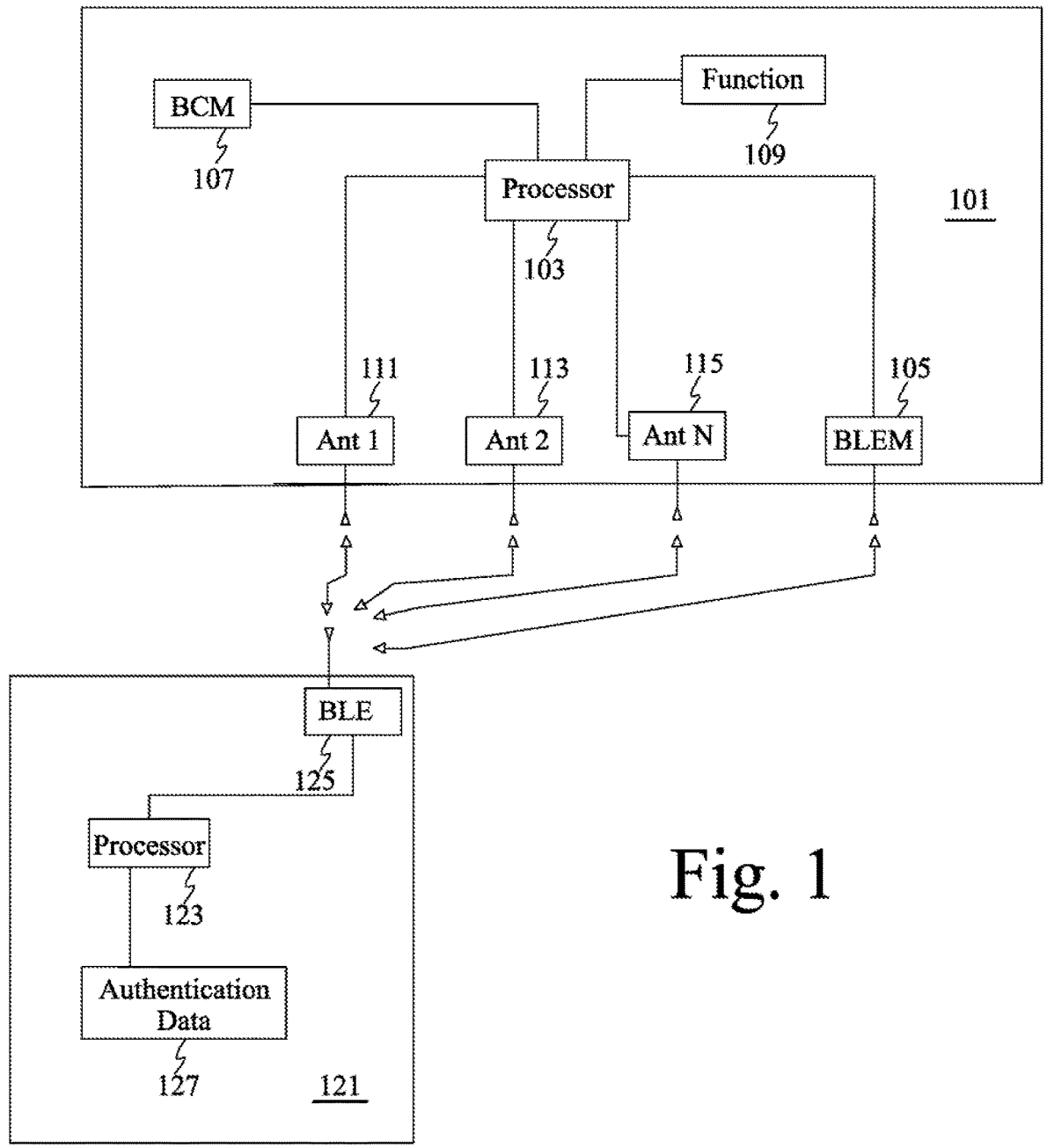
FIG. 1 shows an illustrative example of a vehicle and user device communication system.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the illustrative examples, an example of a user phone (e.g., smartphone) used in place of a traditional key fob is proposed and discussed. The user wireless device replacing the fob could also be another wireless device, and the methods and systems herein can be used for other types of authentication and device-searching as appropriate.

The illustrative examples discuss systems whereby a vehicle searches for a user wireless device to authenticate a vehicle access request. In the examples, this is typically done using a BLUETOOTH low energy module (BLEM), which works in conjunction with a vehicle antenna array to localize a user device and confirm that a valid device is within a predefined proximity of the vehicle before approving the vehicle access command (e.g., unlock, start, etc.).

When the BLEM receives a search request from another vehicle module, the full antenna array may not yet be powered, especially if the vehicle is powered down. This can cause the BLEM to return a "device not found" or similar response to the search request. This may require the user to push the button or send the request again, causing a diminished user experience (because a fob may self-authenticate in a way that a user device may not be able to), and this in turn may cause the user to eschew using their own device.

The illustrative embodiments can cause the BLEM to send additional search requests, which can result in an eventual valid/approved result even if the antenna array is not yet powered. At the same time, these searches may block other search requests from the vehicle, even if the other searches have a higher priority designation, and/or may add drain to a vehicle power system. Accordingly, in certain embodiments, the vehicle also selectively determines which types of searches should be repeated based on predefined vehicle states. This allows the BLEM to respond to only certain circumstances with a repeated search, avoiding unnecessary search queueing, improving the functionality of the overall system with regards to user experience and timely results, and preserve power as much as possible.

The illustrative embodiments present methods and systems for searching for a key/device that will selectively continue to send one-time search requests. The selectively can be based on real-time status information regarding the active state of the wireless antennas and other relevant vehicle states.

In addition to being applicable to finding a mobile device (e.g., phone) for authenticating an unlock request, the illustrative embodiments are applicable to other antenna-based wireless searching technologies and other search-purpose use-cases.

When BLEM receives a search request to search for an approved BLUETOOTH low energy (BLE) device (e.g., a user device) within a predefined distance of a vehicle, the existence of which may be a condition for approving an unlock or similar request, the BLEM may fail to find the device if an antenna array is offline or partially online. This can be true even if the device is within the appropriate distance. If the antennas are not in an active state where their results can be immediately received and determined to be accurate, additional search requests will continue in the attempt to receive and process antenna data, until the accuracy can be determined and the final result used to respond to and complete the original search request.

In one illustrative example, when a user activates a door switch to open a door, a search request is generated to authenticate any authorized devices in proximity to the vehicle. Due to latency concerns, the BLEM will immediately respond to the search request with the localization status of any connected devices in the requested search zone. If the BLEM is not actively communicating with additional BLE Antenna Modules (BLEAMs, aka "antenna army"), the BLEM will not have accurate information to localize any devices in the searched location and it will respond to the search request with an "Invalid" result (aka "not found").

Due to latency concerns, the search logic on a body control module (BCM) may only process one response per request and will not currently accept any additional responses once the search is completed.

When the user presses an exterior button to request an 'unlock' of a door, a search request will be generated. If the BLEM is not communicating with the BLEAMs, the search will be completed with the above mentioned "Invalid" (not found) result and the user will be required to press the button again and repeat the process until the BLEM can bring all antennas online for localization accuracy.

Depending on the patience of the user, they may press the button multiple times before the BLEM can bring the BLEAMs online and a BLE device can be authenticated and a "valid" (found) result can be sent to complete the search, upon where the door will be unlocked. When the button is pressed and the door does not unlock as expected, the user experience may suffer.

In an illustrative example, when the BCM receives an "Invalid" (not found) result from the BLEM, a method based on the BLEM's power mode status informs the BCM to send an additional search request. When responding to a search request, in addition to the search result, the BLEM will also send to the BCM a signal with the BLEM's current power mode.

When the BCM receives an "Invalid" (not found) result, the BCM may use the BLEM's power mode status to make the decision if it shall send an additional search. To avoid unnecessary battery drain and delaying any other queued search requests in the BCM, there are certain BLEM power modes that may not generate a repeated search when receiving an "Invalid" (not found).

In some vehicles, an active search will prohibit a queued search from executing, even if it is a higher priority search type. To accommodate this, to reduce the potential for delayed queued searches, the BCM may have a configured amount of time it will wait until forcefully completing the search, even if a result is never received.

When appropriate, the illustrative embodiments continuously send a search when receiving "Invalid." To mitigate additional risk to other queued search requests, in some examples, the BCM may execute the retries while within a single configurable window of time as described above, upon where it will forcefully complete the search and accept "Invalid" if no "valid" result is received within the time window.

The time window is also a useful limiting step in some embodiments because the BCM does not know how long it will take the BLEM to bring the antennas online and into the "Full Localization" mode (upon where results are considered accurate). The BCM then balances the possibility of a negative user experience with the possibility of blocking other search requests by continually searching via the BLEM and the implications of blocking those other requests.

FIG. 1 shows an illustrative example of a vehicle 101 and user device 121 communication system. In this example, the vehicle 101 includes one or more processors 103 that are capable of communicating with and handling instructions to/from various vehicle 101 modules. For example, the vehicle 101 may include a BLUETOOTH low energy module (BLEM) 105, usable to communicate with the user device 121.

A body control module (BCM) 107 may also provide command functionality for user requests, such as instructing the BLEM 105 to localize user devices 121 when a request to the BCM is received (e.g., an access request). Various function modules (e.g., unlock) 109 may provide the requests to the BCM 107, which in turn may instruct localization through the BLEM 105.

The BLEM 105 may localize a user device 121 through use of an onboard antenna array 111, 113, 115. The antennas of the array 111, 113, 115 may work in conjunction to determine the proximity of a user device 121. As previously noted, when one or more antennas 111, 113, 115 is not yet powered at the time the BCM 107 sends a request to the BLEM 105, the BLEM 105 may need to bring the antennas 111, 113, 115 online before it can return a valid result to the BCM 107.

The user device (phone, watch, tablet, etc.) 121 may also include a BLE communication element 125 connected to a processor 123. Also, in this example, the device 121 may include authentication data 127, which can include device identifying data and any other data that is usable by the BLEM 105 to confirm that the device 121 is one that meets a localization request. That is, the BLEM 105 searches for an approved device within the predefined locality, not simply any BLE enabled device.

FIG. 2 shows an illustrative continual search process executable by, for example, the vehicle 101 in conjunction with the processor 103, the BCM 107, the BLEM 105 and the antennas 11, 113, 115. In this example, the BCM 107 may receive a request at 201, such as a request from a functional module 109 within the vehicle 101 (e.g., an unlock request).

When a user device 121 is the basis for authentication, and if the request is received at the vehicle 101, for example, the vehicle 101 may need to confirm that an approved user device 121 is within a predefined proximity of the vehicle 101. The vehicle 101 can instruct the BLEM 105 to search for a local approved user device 121 at 203. If the antenna array is online, the BLEM 105 may find the device 121, if the device is within range, and may return a positive result for localization.

In this example, whether the BLEM executes a continual search (more than one) is predicated on the power state of the BLEM and/or antenna array. Accordingly, in this example, the vehicle receives both a user-device status at 205 and a BLEM power mode at 207. The first is an indicator of whether a user device 121 was detected within a verified range, the second is an indicator of the system power state(s), usable to determine if searching should continue.

If the returned state from the BLEM 105 is "Valid" at 209, then the valid result is verified and the vehicle 101 can process the command request at 211. For example, if the vehicle 101 is already powered, there is a reasonable chance that the antenna array is also powered, and thus the BLEM 105 may return an immediately usable result.

Since many unlock requests and similar access requests come when the vehicle 101 is not already powered, the BLEM may return an "invalid" result at 209 even if a user device 121 is within the predefined proximity, simply because the antennas are not yet online and cannot reliably verify the location of the device. When "invalid" is received at 209, the vehicle 101 then determines at 213 whether a secondary trigger is present that is defined as corresponding to a vehicle state for which continual searching is desired.

If an additional search is not desired or instructed at 215, the vehicle 101 accepts the "invalid" state as verified or appropriate and will not continue to search for the user device 121, terminating the search at 221. To resume the search in this instance, the user would typically resend the request, and there are plenty of instances where the "invalid" result is reasonable, such as the user device 121 being out of the predefined proximity. If an additional search is desired at 215, the vehicle 101 will start (or advance, if already started) a timer at 217.

The timer is used in this example because the active search request in the BLEM/BCM may block other search requests, even if the other search requests have a priority designation higher than the active search request. To prevent blocking of all other searches indefinitely while the BLEM attempts to complete localization, the vehicle 101 may have a timeout associated with the active BLEM continual search request. If the timer advances to a point where the timeout limit is met at 219, the vehicle 101 accepts the "invalid" result as final at 221. Otherwise, the vehicle 101 repeats the process for searching until either a valid result is obtained, a verified invalid result is obtained, or the timeout occurs (in this example).

FIG. 3 shows an illustrative conditional evaluation for continual search. This is an example of the logic that can be used to determine whether the BLEM 105 should execute a continual search for the local, mobile device 121 and is based on BLEM-reported power states, in this example.

Example power states in this example are as follows:

1) Background Scan—no BLE devices are connected, antenna array (BLEAMs) is not online.

2) Connection Following—at least one BLE device is connected, antenna array (BLEAMs) is not online, the BLEM cannot yet localize. In this state, certain events may not require all antenna to come online, the BLEM may know which states can use less than all the antenna and respond accordingly based on currently-online antenna.

3) Pause Localization—the antenna array (BLEAMs) is not completely online, the BLEM cannot localize. The additional BLE antenna modules in this mode may be operational but not communicating with the BLEM. The BLEM may only need to send a request for information to the BLEAMs for them to report their localization data, at which time the power mode will change to Full Localization. However, before this can happen, the BLEM may end up sending "Invalid" (not found) at least once.

4) Full Localization—this may be possible if all BLEAMs are online and the BLEM has the necessary accuracy to determine the any device's localization.

If the vehicle 101 determines that the BLEM reports a background scan (or equivalent) state at 301, the vehicle 101 may prevent further searching at 303. The logic for whether a search is continued or not can be embedded in the appropriate vehicle 101 module depending on system implementation. Presumably, in this example, when the vehicle 101 can determine that no devices are connected via BLE to the BLEM, there is a diminished desire for continual scanning because there appear to be no devices 121 to detect (e.g., the user device 121 is powered down and will not respond to scanning in any event).

If the BLEM power mode is the connection following mode at 305, the vehicle 101 can request an additional search at 307. Again, the logic for whether one or more antenna is needed for localization, or single antenna communication is sufficient for validation (for certain requests) can be embedded in the appropriate vehicle module. In this mode, there is at least one device 121 already connected via BLE, so it is more reasonable to continue to attempt to localize the device.

If the BLEM is in pause localization mode at 309, this may indicate that one or more antennas is online but has not yet reported localization results to the BLEM. Continuation of the search at 307 in this example allows the antenna time to report the results, to ensure a verified result.

Finally, in this example, the BLEM may report that all antenna are online and have reported in the full localization mode at 311. This allows the BCM 107 or other module to accept the reported results as valid and take the appropriate action.

Figure 4:
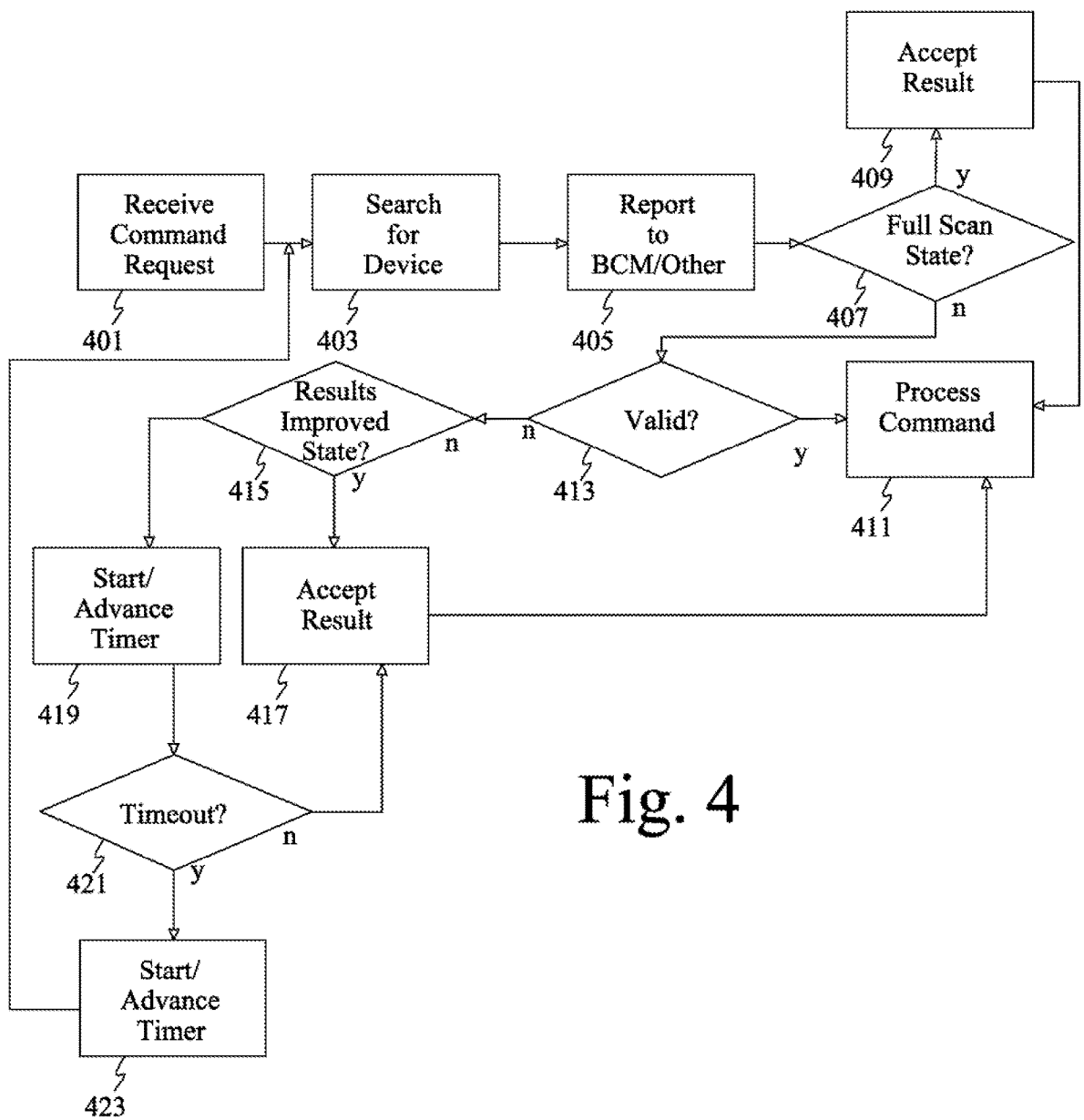
FIG. 4 shows a further illustrative continual search process.

FIG. 4 shows a further illustrative continual search process. In this example, the BLEM 105 or similar searching module may receive a request to localize a device at 401. This example is more generic in nature, to demonstrate that the illustrative systems and methods can be used in conjunction with commands beyond those designated for vehicle access.

In response to receiving the command, the BLEM 105 searches for a user device 121 at 403. As previously noted, this can include an attempt to determine if the user device 121 is within a predefined locality of the vehicle 101. This search may use a vehicle 101 antenna 111, 113, 115 array to localize the user device 121, and, as before, the antenna array may not immediately be powered when the search request is received at the BLEM 105.

Based on the results of the search and a power status or power mode of the BLEM 105 and the antenna array, the BLEM 105 reports the search results and the power mode to a requesting module at 405 (e.g., BCM 107 or other module).

In this example, if the BLEM 105 has reported that it verifies the result reported (e.g., it is in a full-scan state appropriate for a given request response) at 407, the module receiving the report accepts the report (e.g., "valid," "invalid") as legitimate at 409, and no further searching is performed. In this instance, the requesting module can then process or deny a requested action at 411, as appropriate based on the BLEM 105 response that has been verified.

If the full-scan state is not reported, but the BLEM reports a "valid" localization result at 413, then the full-scan state may not be required for the particular request, and thus the requesting module can be assured based on the "valid" report that the conditions for the request are met and verified. The BLEM or another module can determine what level of verification is needed for a given request, and so some requests may be verifiable based on simple BLE communication, for example, without a full localization scan. This may be achievable with only one antenna 11, for example, and thus the results are valid despite the full array not being online.

If the BLEM 105 returns an "invalid" result and a power state that indicates that results may improve with further scanning at 415, the vehicle 101 (or requesting module or BLEM 105) may initiate or advance a timer at 419. Again, this may help prevent situations where an active lower-priority request blocks a desired higher priority request. As long as the request has not timed-out at 421, the BLEM 105 may continue to attempt additional scanning at 423.

Once the request times-out at 421 and/or an otherwise valid result is received based on BLEM power states at 407, for example, the vehicle 101 or requesting module may accept the result as valid at 417 or 409 and may then process or deny the requested command that triggered the search, accordingly at 411.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A vehicle comprising:
   a search system including at least one antenna;
   a wireless transceiver controller; and
   a processor configured to:
   receive an access request for the vehicle, input via an input of the vehicle;
   responsive to the access request, send a search instruction to the wireless transceiver controller to search for a wireless device within a predefined distance of the vehicle using the search system, the wireless device being predefined as an authorized device;
   receive a response, to the search instruction, from the wireless controller indicating search results and a state indicator indicating a state of the search system associated with the wireless transceiver controller; and
   responsive to the state indicator specifying a state predefined as corresponding to a final result state for fulfilling the request, utilize the search results to determine if the access request should be granted and responsive to the state indicator specifying a state predefined as corresponding to an in-progress state, the in-progress state indicating that an improved response will be available at a future time, re-instruct the search and repeat the response reception.

2. The vehicle of claim 1, wherein the access request includes an unlock request.

3. The vehicle of claim 1, wherein the access request includes a start request.

4. The vehicle of claim 1, wherein the search system includes an array of antennas.

5. The vehicle of claim 1, wherein the state indicator predefined as corresponding to the final result state includes an indicator that the search system is fully operational.

6. The vehicle of claim 1, wherein the state indicator predefined as corresponding to the final result state includes an indicator that the search system is operational to a level predefined as being suitable for servicing the request.

7. The vehicle of claim 1, wherein the state indicator predefined as corresponding to the final result state includes an indicator that no wireless device is presently detected by any element of the search system.

8. The vehicle of claim 1, wherein the state indicator predefined as corresponding to the in-progress state includes an indicator that one or more elements of the search system are still being powered up.

9. The vehicle of claim 1, wherein the state indicator predefined as corresponding to the in-progress state includes an indicator that one or more elements of the search system are still being powered up and that a wireless device is presently detected by at least one active element of the search system.

10. A vehicle comprising:
    an antenna array in communication with a BLUETOOTH low energy module (BLEM); and
    a processor configured to:
    receive an unlock request for the vehicle, input at the vehicle;
    responsive to the unlock request, instruct the BLEM to confirm whether an authorized device is within a predefined distance of the vehicle, via a search using the antenna array;

receive a response from the BLEM including a state indicator for the antenna array; and conditional on the state indicator, either utilize the response or repeat the instruction and reception of the response.

11. The vehicle of claim 10, wherein the response confirms that the authorized device is within the predefined distance and the state indicator indicates that the antenna array is fully powered, and wherein the processor is configured to utilize the response.

12. The vehicle of claim 10, wherein the response confirms that the authorized device is within the predefined distance and the state indicator indicates that a predefined number of antennas in the antenna array, predefined for a type of the request, are fully powered, and wherein the processor is configured to utilize the response.

13. The vehicle of claim 10, wherein the response confirms that no authorized device is determined to be within the predefined distance and the state indicator indicates that the antenna array is fully powered, and wherein the processor is configured to utilize the response.

14. The vehicle of claim 10, wherein the response confirms that no authorized device is determined to be within the predefined distance and the state indicator further indicates that the BLEM is not connected to a device, and wherein the processor is configured to utilize the response.

15. The vehicle of claim 10, wherein the response confirms that no authorized device is determined to be within the predefined distance and the state indicator indicates that the antenna array is still being powered and further that the BLEM is connected to at least one potential authorized device, and wherein the processor is configured to repeat the instruction and reception of the response.

16. A non-transitory computer-readable storage medium comprising instructions that, when executed by a processor, cause the processor to perform operations including to:

receive a vehicle access request to access a vehicle;

responsive to the request, instruct a wireless transceiver module to search for a wireless device within a predefined distance of the vehicle;

receive a response from the wireless transceiver module, including a state of a search system used by the wireless transceiver module to complete the search for the wireless device and a result of the search for the wireless device; and contingent on the state of the search system, either utilize the result of the search or repeat the steps of instructing and receiving.

17. The non-transitory computer-readable storage medium of claim 16, wherein the search system includes an antenna array.

18. The non-transitory computer-readable storage medium of claim 16, wherein the state of the search system indicates a fully powered search system and the method includes utilizing the result of the search.

19. The non-transitory computer-readable storage medium of claim 16, wherein the state of the search system indicates a partially powered search system, predefined as sufficiently powered for fulfilling the search based on the type of request, and the method includes utilizing the result of the search.

20. The non-transitory computer-readable storage medium of claim 16, wherein the state of the search system includes a partially powered search system and the method includes repeating the instructing and receiving.

* * * * *